United States Patent [19]
Aldred et al.

[11] Patent Number: 5,832,059
[45] Date of Patent: Nov. 3, 1998

[54] CALL PATH SYSTEM AND METHOD FOR MODELING AND MODIFYING A CALL PATH OF A TELEPHONE CALL ROUTED BY A TELEPHONE SWITCH

[75] Inventors: Edward Peter Aldred, Lake City, Colo.; Daniel M. Righi, Fairfax, Va.; Paul E. Van Berkum, Geneva, Ill.

[73] Assignee: Rockwell International Corp., Costa Mesa, Calif.

[21] Appl. No.: 723,738

[22] Filed: Sep. 30, 1996

[51] Int. Cl.$^6$ ............................ H04M 1/24; H04M 3/08; H04M 3/22

[52] U.S. Cl. ............................ 379/34; 379/265; 379/127; 379/120

[58] Field of Search ...................... 379/112, 113, 379/34, 133, 134, 136, 265, 266, 210, 211, 309, 198, 201, 272, 273, 45, 9.317, 93.23, 120, 127

[56] References Cited

U.S. PATENT DOCUMENTS

| | | | |
|---|---|---|---|
| 4,464,543 | 8/1984 | Kline et al. | 379/34 |
| 4,510,351 | 4/1985 | Costello et al. | 379/34 |
| 4,837,790 | 6/1989 | Prohls et al. | 379/224 |
| 4,893,325 | 1/1990 | Pankonen et al. | 379/45 |
| 5,008,930 | 4/1991 | Gawrys et al. | 379/210 |
| 5,077,788 | 12/1991 | Cook et al. | 379/142 |
| 5,109,399 | 4/1992 | Thompson | 379/45 |
| 5,140,611 | 8/1992 | Jones et al. | 379/22 |
| 5,168,515 | 12/1992 | Gecher et al. | 379/45 |
| 5,185,780 | 2/1993 | Leggett | 379/34 |
| 5,235,630 | 8/1993 | Moody et al. | 379/45 |
| 5,270,919 | 12/1993 | Blake et al. | 379/136 |
| 5,274,700 | 12/1993 | Gechter et al. | 379/210 |
| 5,339,351 | 8/1994 | Hoskinson et al. | 379/45 |
| 5,347,567 | 9/1994 | Moody et al. | 379/45 |
| 5,347,568 | 9/1994 | Moody et al. | 379/45 |
| 5,388,145 | 2/1995 | Mulrow et al. | 379/45 |
| 5,388,147 | 2/1995 | Grimes | 379/45 |
| 5,388,150 | 2/1995 | Schneyer et al. | 379/67 |
| 5,404,350 | 4/1995 | Devito et al. | 379/45 |
| 5,465,286 | 11/1995 | Clare et al. | 379/34 |
| 5,479,482 | 12/1995 | Grimes | 379/45 |
| 5,511,109 | 4/1996 | Hartley et al. | 379/40 |
| 5,535,256 | 7/1996 | Maloney et al. | 379/88 |
| 5,555,297 | 9/1996 | Ochy et al. | 379/136 |
| 5,586,178 | 12/1996 | Koenig et al. | 379/265 |
| 5,715,307 | 2/1998 | Zazzera | 379/265 |
| 5,751,795 | 5/1998 | Hassler et al. | 379/265 |

*Primary Examiner*—Forester W. Isen
*Assistant Examiner*—Rexford N. Barnie
*Attorney, Agent, or Firm*—Welsh & Katz, Ltd.

[57] ABSTRACT

A call path system generates a graphical representation of a call path of a selected type of telephone call routed by a telephonic switch 100. An administrator computer system 110 includes a computer 112 and administrator display 114 for generating and displaying the graphical representation. The graphical representation may be a block diagram 200 consisting of telephone call type 202, application 204, scripts 206, agent group 208, agents/staff 210, supervisor 214 and a particular agent group I 212. Each of the blocks include available selections in the particular category. Such as a listing of agent groups 304, a listing of telephone types 300, a listing of available DNIS numbers 302 and a listing of agents/staff 306. The call path system further permits an administrator, via the administrator computer system 110 to select and any of the above. Applications may be modified such that the telephonic switch 100 thereafter routes telephone calls in accordance with the modified applications.

15 Claims, 3 Drawing Sheets

5,832,059

CALL PATH SYSTEM AND METHOD FOR MODELING AND MODIFYING A CALL PATH OF A TELEPHONE CALL ROUTED BY A TELEPHONE SWITCH

FIELD OF THE INVENTION

The present invention relates generally to systems for monitoring, or modeling, activities within a call center and, more particularly, to a call path system and method for modeling activities within a call center wherein a display provides a graphical representation of a path of a telephone call, or a type of telephone call, routed through the call center and wherein the path of such a telephone call may be modified through the display.

BACKGROUND OF THE INVENTION

Call centers employing telephonic switches are increasingly being used by businesses to automatically route customer telephone calls to available agents. One common type of telephonic switch is an automatic call distributor (ACD) which generally includes a multiport switch controlled by a central processing unit (CPU) to interconnect the customers and the agents. An example of one such ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

Management personnel continually monitor the activities of the call center to assure that callers, or customers, are being promptly assisted by agents having the desired skills. The call center is also monitored for efficient use of resources, such as agents, voice response units, and the like. Unfortunately, prior call centers do not provide an easy method for monitoring the path of a telephone call. Call reports have typically been generated containing data relating to routed telephone calls. However, such reports are compilations of a plurality of telephone calls and are consequently not very helpful in analyzing the call path of a single telephone call, or type of telephone call.

Accordingly, there is a need in the art for a system and method for monitoring activities in a call center wherein a path of a telephone call through the call center is graphically represented and wherein specific features of call processing in the call center may be modified through the graphical representation.

SUMMARY OF THE INVENTION

This need is met by a call path system and method of the present invention wherein a graphical representation, such as a block diagram, of a call path for a type of a telephone call is generated and displayed on a video screen. The call path for any particular type of telephone call may be modified through the graphical representation.

In accordance with one aspect of the present invention, a call path system models a call path of a telephone call routed by a telephonic switch. The call path system comprises a computer connected to the telephonic switch for acquiring information relating to the call path and for generating a display of the call path. A display, such as video screen, visually displays the generated display of the call path. The computer may comprise an input device for modifying the call path. In such as case, the computer would notify the telephonic switch of the modifications and the telephonic switch would thereafter route telephone calls of that type in accordance with the modifications. The computer may further comprise a graphical generator for generating a graphical representation of the call path, and wherein the display visually displays the graphical representation.

In accordance with another aspect of the present invention, a method for monitoring a call path of a telephone call routed by a telephonic switch is provided. The method comprising the steps of determining the call path of the telephone call; and visually displaying the call path of the telephone call. The method may further comprises the step of providing information relating to the telephone call. In such a case, the step of determining comprises the step of determining the call path of the telephone call based on the information. The displaying of the call path may be accomplished by generating a graphical representation representative such as a block diagram, of the call path; and visually displaying the graphical representation. The block diagram may contain a block representative of available types of telephone calls, a block listing available DNIS numbers indicating the type of the telephone call, a block listing available ANI numbers indicating the type of the telephone call, a block containing a list of applications.

Preferably, the method further comprises the step of modifying the call path. Modification of the call path may be accomplished by selecting at least a portion of the graphical representation; and modifying the selected portion. which would handle the telephone call, and/or a block containing a list of agents who would handle the telephone call.

These and other features and advantages of the present invention will become apparent from the following detailed description, the accompanying drawings and the appended claims.

DETAILED DESCRIPTION OF THE INVENTION

Figure 1:
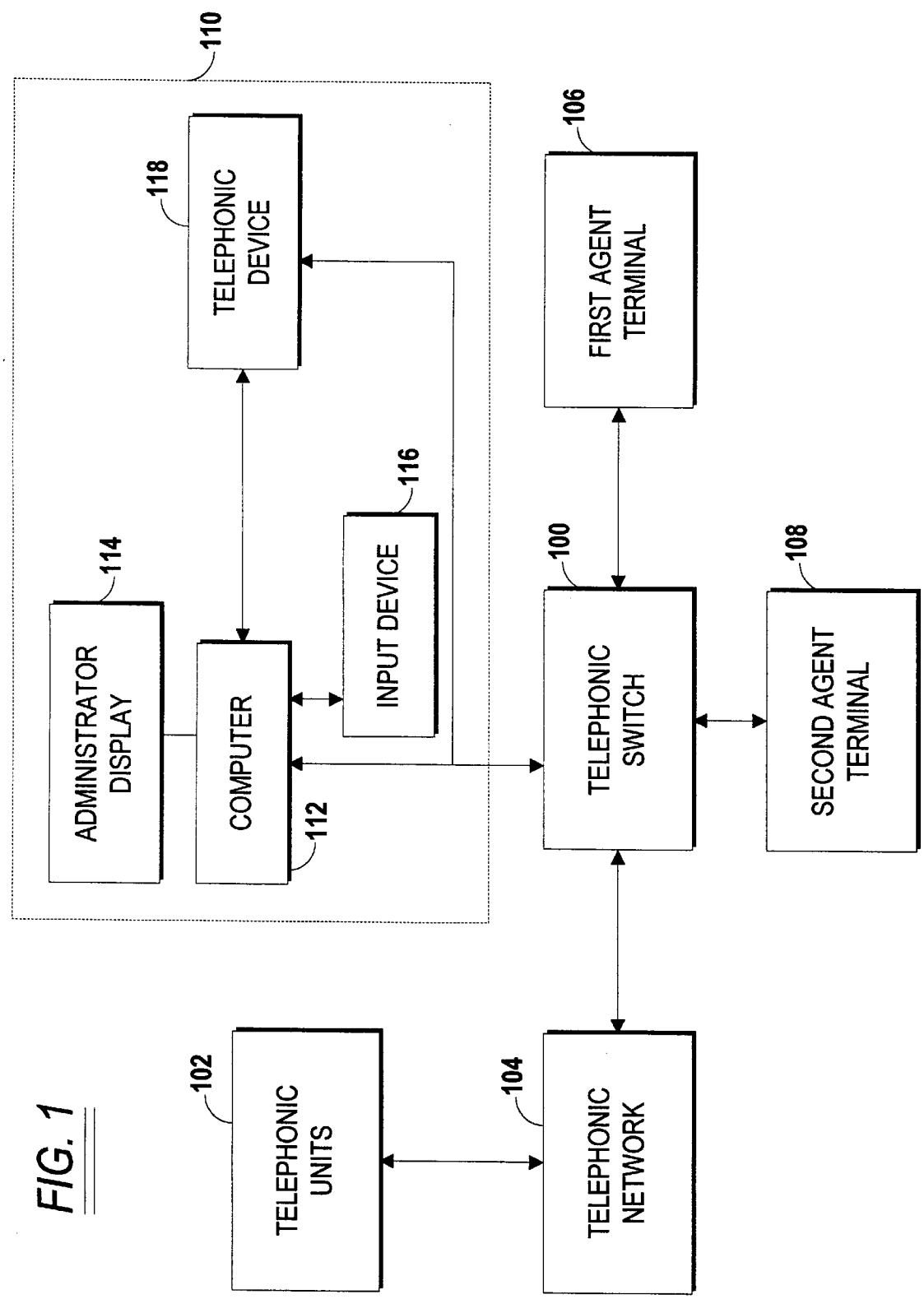
FIG. 1 is a block diagram of a telephone switching system in which a call path system in accordance with the present invention may be advantageously implemented in conjunction with an administrator computer system.

A telephonic switching system for implementing a call path system in accordance with the present invention for modeling and modifying a call path of a telephone call routed by a telephonic switch 100 is show in FIG. 1. Callers place telephone calls from telephonic units 102 which are transmitted over a telephonic network 104 to the telephonic switch 100, which may be an ACD. The telephonic switch 100 routes the telephone calls to a first agent terminal 106 and a second agent terminal 108. As those skilled in the art will readily appreciate, the telephonic switch 100 may service telephone calls in any of a number of manners. For example, an automated attendant (voice response unit) may service one or more of the telephone calls or one or more of the telephone calls may be transferred by the telephonic switch 100 to another telephonic switch. For ease of description and clarity, however, only first and second agent terminals 106 and 108 are shown handling the telephone calls. It should be understood that any call processing by the telephonic switch 100 can be monitored with the call path system of the present invention.

Administrative, or supervisory, personnel monitor call processing activity within the telephonic switching system via an administrator computer system 110. The administrator computer system 110 includes a computer 112 and an administrator display 114 including an input device 116, such as a keyboard or mouse. A telephonic device 118 communicates with the computer 112 and the telephonic switch 100. The telephonic device 118 permits an administrator, or supervisor, to listen and talk to callers and/or agents. The agent terminals 106 and 108 may contain similar equipment as the administrator computer system 110 to provide audio and data communications between an agent and a caller. Furthermore, it is contemplated that the call path system of the present invention may be implemented at the agent terminals 106 and 108, if desired.

Figure 2:
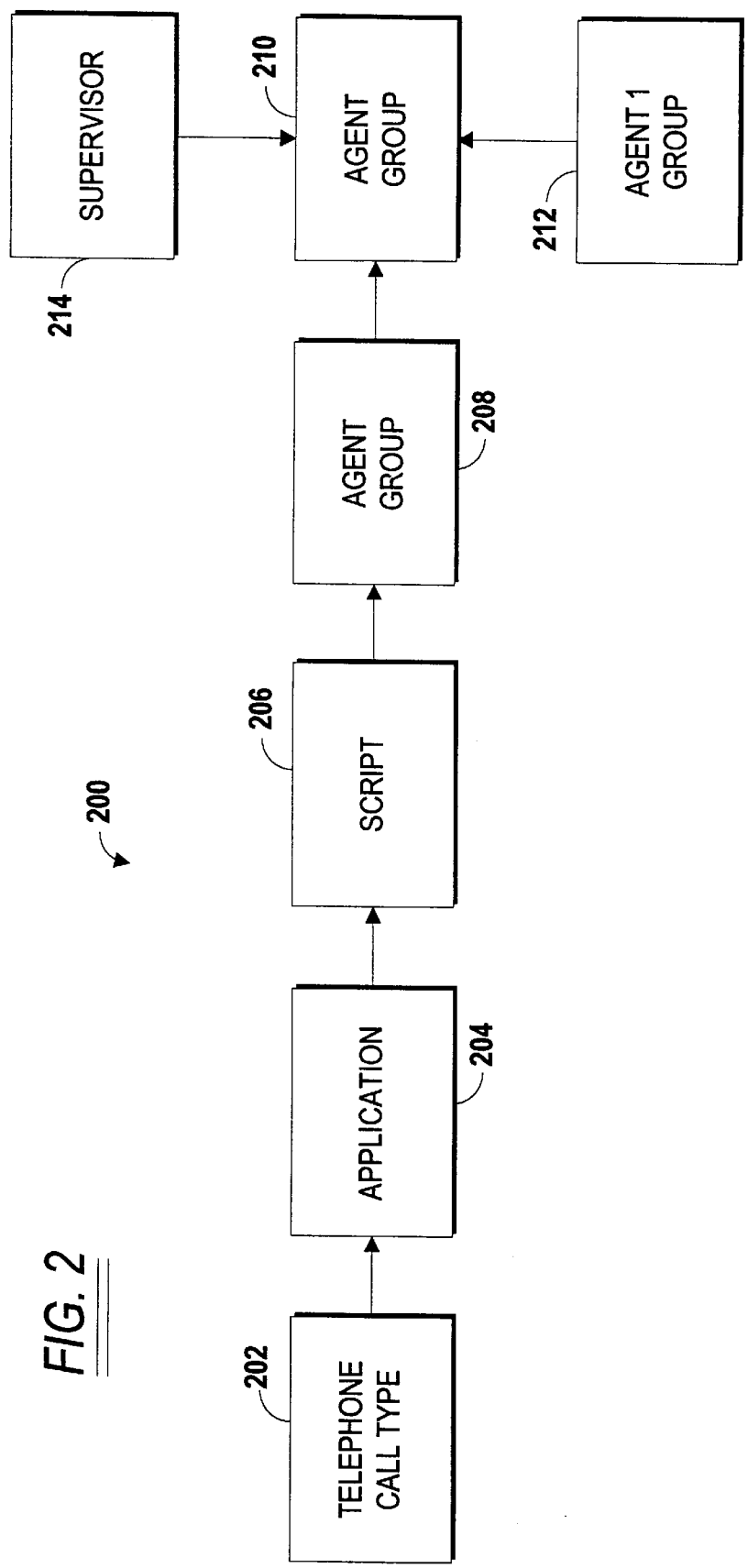
FIG. 2 is a block diagram of a graphical representation of a call path as generated by the call path system implemented in FIG. 1.
Figure 3:
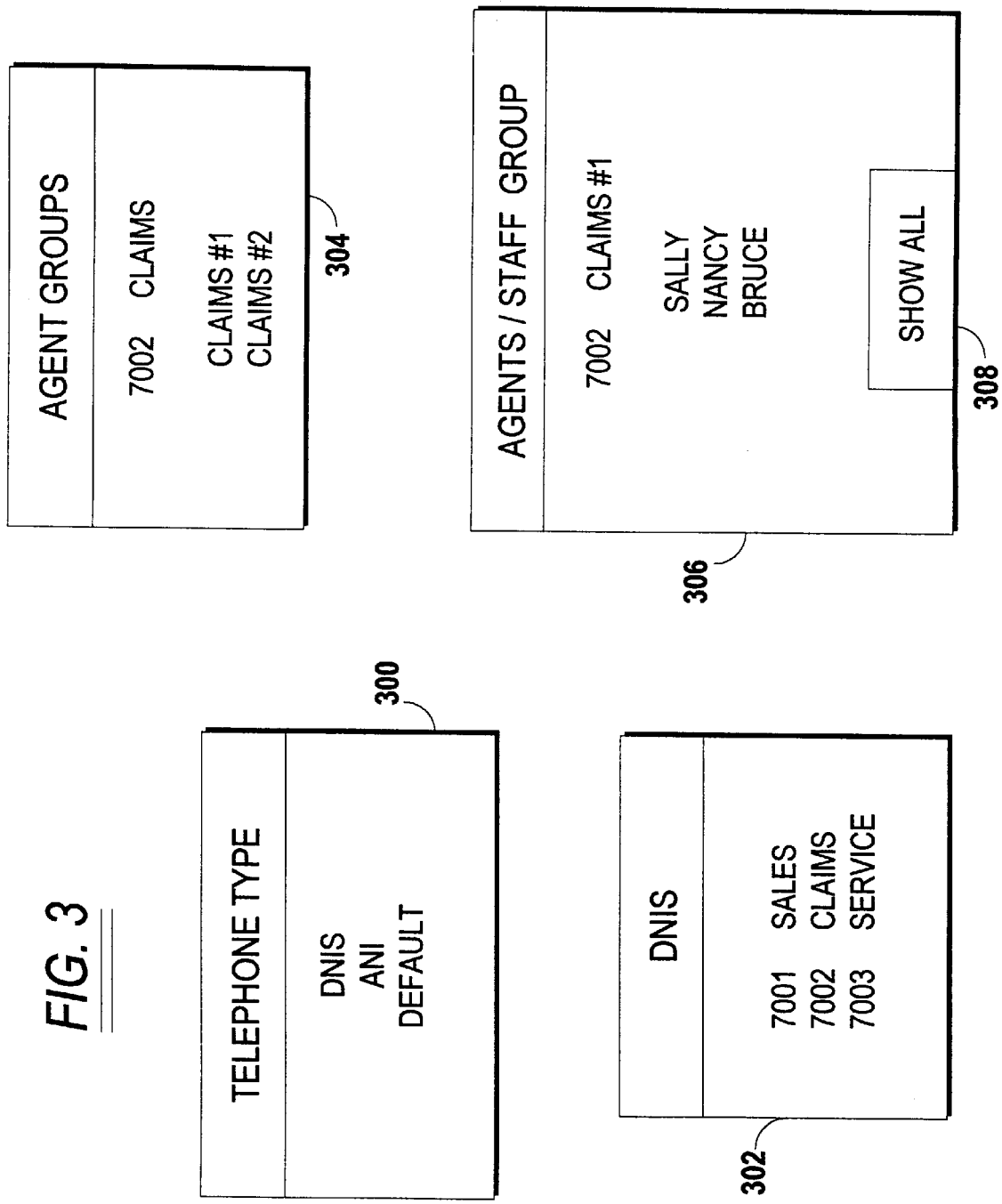
FIG. 3 is a detail diagram of the blocks contained in the block diagram shown in FIG. 2.

The computer 112 executes various programs for monitoring and modifying the call path of a telephone call. Various graphical representations which may be included in an exemplary call path are shown in FIGS. 2 and 3. FIG. 2 shows a call path, represented by a block diagram 200, consisting of typical locations, or points, along the call path. Preferably, this overall call path flow chart is initially displayed on the administrator display 114 when an administrator is monitoring the system. As will be readily evident to those skilled in the art, the locations (or blocks) in the call path shown in FIG. 2 are only exemplary and locations may be added or deleted.

A telephone call is received by the telephonic switch 100 from the telephonic network 104. The telephonic switch 100 further receives information relating to the type of the telephone call. For example, the telephone call may include dialed number identification service (DNIS) or automatic number identification (ANI) information. Absent any DNIS or ANI information, the telephonic switch 100 is programmed to route the telephone call in accordance with a default procedure. The available telephone call types are represented by block 202.

Based on the DNIS, ANI or the default procedure, the telephone call is assigned to a software-based application 204 for routing. At the computer 112 the administrator is able to modify the applications 204 by selecting the desired application. The telephonic switch 100 thereafter routes telephone calls in accordance with the modified applications. Agent scripts 204 are assigned to each application which agents use to record announcements. Based on the information received or obtained relating to the telephone call, an application selects an agent group, and, within the selected agent group, selects an agent to handle the telephone call. As is well known, the agent is selected based on many factors including skills, availability and the like. The application then routes the telephone call to the selected agent. The application activates the proper announcements, such as a personnel greeting, for the selected agent. The announcements are based on the scripts and are, preferably, recorded by the agent who is going to handle the telephone call. The total number of agents/staff members available to the telephonic switch 100 is designated by block 210. The agent group members of the agent group selected to service the telephone call are designated by block 212. A supervisor 214 monitors the agent/staff members 212. The present invention advantageously provides a complete call path on a single graphical display, as shown in FIG. 2. An administrator may select any of the blocks to view and/or modify its contents.

The administrator initially selects the telephone call type 202. A telephone type display window 300 of available types of telephone calls is then displayed to the administrator. As can be seen from the window 300, the administrator may select from three types of telephone call characteristics to define which telephone calls are to be reviewed. The administrator may select telephone type by the DNIS information, the ANI information or the default procedure.

If the administrator selects DNIS call type, a DNIS display window 302 is opened of available DNIS numbers. The listed DNIS numbers are shown as 7001 Sales, 7002 Claims and 7003 Service. In response to the DNIS number selection by the administrator, an agent group window 304 is opened. The agent group window 304 contains all of the agent groups associated with the selected DNIS number. In this case, DNIS number 7002 has agent groups Claims #1 and Claims #2 associated therewith.

The administrator next selects one of the agent groups, such as Claims #1, and an Agents/Staff window 306 is displayed listing the agents in the Claims #1 agent group. As shown, Sally, Nancy and Bruce are in this agent group. The administrator thus knows which agents are going to receive DNIS 7002 telephone calls routed by the telephonic switch 100. In addition, the administrator may select the agent scripts block 206 and a listing of agent scripts will be shown. The administrator can then select any of the agent scripts to modify/edit the script.

Advantageously, the present invention further provides that the administrator can perform many administrative functions, such as retrieving historical reports on agents, assigning agents to agent groups, and the like. For example, the administrator selects the show all button 308 in the Agent/Staff window 306 to list all of the agents associated with the telephone switching system. By clicking and dragging, the administrator can add and subtract agents from the agent groups.

The structure, control and arrangement of the conventional components and circuits have, for the most part, been illustrated in the drawings by readily understandable block representations and schematic diagrams, which show only those specific details that are pertinent to the present invention. In order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A call path system for monitoring and displaying information regarding a prospective call path of telephone calls received from a public switched telephone network and routed by a telephonic switch of an automatic call distributor to agents of the automatic call distributor, such system comprising:

a computer connected to the telephonic switch of the automatic call distributor for acquiring information relating to the prospective call path based upon an identity of a caller and for generating a telephone system functional display of the prospective call path located between the telephonic switch and the agents; and a display for visually displaying the display of the prospective call path.

2. The call path system as recited in claim 1 wherein the computer comprises an input device for modifying the prospective call path; and wherein the computer notifies the telephonic switch of the modifications.

3. The call path system as recited in claim 2 wherein the computer comprises:

a graphical generator for generating a graphical representation of the prospective call path, and wherein the display visually displays the graphical representation.

4. A method for monitoring a prospective call path of telephone calls received from a public switch telephone network and routed by a telephonic switch of an automatic call distributor to agents of the automatic call distributor, such method comprising the steps of:

determining the prospective call path of the telephone call to be routed by the telephonic switch to the agents of the automatic call distributor; and visually displaying a telephone system functional view of the prospective call path located between the telephonic switch and the agents.

5. The method as recited in claim 4 comprising the step of:

providing information relating to the telephone call, and wherein the step of determining comprises the step of: determining the prospective call path of the telephone call based on the information.

6. The method as recited in claim 5 further comprising the step of:

modifying the prospective call path.

7. The method as recited in claim 5 wherein the step of visually displaying comprises the steps of:

generating a graphical representation representative of the prospective call path; and visually displaying the graphical representation.

8. The method as recited in claim 7 wherein the step of generating a graphical representation further comprises the step of:

generating a block diagram representative of the prospective call path.

9. The method as recited in claim 8 wherein the step of generating a block diagram comprises the step of:

generating a block representative of available types of telephone calls.

10. The method as recited in claim 9 wherein the step of generating a block comprises the step of:

generating the block listing available DNIS numbers indicating the type of the telephone call.

11. The method as recited in claim 9 wherein the step of generating a block comprises the step of:

generating the block listing available ANI numbers indicating the type of the telephone call.

12. The method as recited in claim 8 wherein the step of generating a block diagram comprises the step of:

generating a block representative of a list of agents who would handle the telephone call.

13. The method as recited in claim 8 wherein the step of generating a block diagram comprises the step of:

generating a block representative of a list of applications which would handle the telephone call.

14. The method as recited in claim 7 comprising the step of:

modifying the prospective call path.

15. The method as recited in claim 14 wherein the step of modifying the prospective call path further comprises the steps of:

selecting at least a portion of the graphical representation; and modifying the selected portion.

* * * * *